US007318036B2

(12) United States Patent
Kim et al.

(10) Patent No.: US 7,318,036 B2
(45) Date of Patent: Jan. 8, 2008

(54) METHOD OF ADVERTISING AND CONDUCTING ELECTRONIC COMMERCIAL TRANSACTIONS THROUGH A COMMUNICATION NETWORK

(75) Inventors: Sang Bum Kim, Koyang-si (KR); Yong Soo Shin, Anyang-si (KR)

(73) Assignee: LG Electronics Inc., Seoul (KR)

( * ) Notice: Subject to any disclaimer, the term of this patent is extended or adjusted under 35 U.S.C. 154(b) by 790 days.

(21) Appl. No.: 10/050,157

(22) Filed: Jan. 18, 2002

(65) Prior Publication Data

US 2002/0099564 A1 Jul. 25, 2002

(30) Foreign Application Priority Data

Jan. 19, 2001 (KR) ...................... 10-2001-0003105

(51) Int. Cl.
*G06Q 99/00* (2006.01)
(52) U.S. Cl. .............................. 705/1; 705/14; 705/26; 705/37
(58) Field of Classification Search ................... 705/1, 705/14, 37, 400; 709/219, 217
See application file for complete search history.

(56) References Cited

U.S. PATENT DOCUMENTS

| 5,721,827 A * | 2/1998 | Logan et al. ................ 709/217 |
| 5,855,008 A * | 12/1998 | Goldhaber et al. ............ 705/14 |
| 6,226,618 B1 * | 5/2001 | Downs et al. .................. 705/1 |
| 6,379,251 B1 * | 4/2002 | Auxier et al. ................. 463/42 |
| 6,587,837 B1 * | 7/2003 | Spagna et al. ................ 705/26 |
| 6,611,811 B1 * | 8/2003 | Deaton et al. ................ 705/14 |
| 6,636,247 B1 * | 10/2003 | Hamzy et al. .............. 715/808 |
| 2001/0014876 A1 * | 8/2001 | Miyashita ..................... 705/37 |

(Continued)

FOREIGN PATENT DOCUMENTS

KR 2000-0024643 5/2000

(Continued)

OTHER PUBLICATIONS

"Wired and Kodak Team-up for 12-Month Cross-Media Advertising Push", Jan. 19, 1998, PR Newswire. New York: p. 1.*

(Continued)

*Primary Examiner*—John W. Hayes
*Assistant Examiner*—Freda A. Nelson
(74) *Attorney, Agent, or Firm*—Ked & Associates, LLP

(57) ABSTRACT

The present invention relates to a method of discounting a multi-media content item, which is to be sold at a purchase request through a communication network, such as the Internet. The discount is offered in proportion to the number of advertisement (ad) items chosen by a buyer to be added to the multi-media content item. With this method, a multi-media content to be sold and at least one ad content are selected individually through the communication network. The multi-media content and the ad contents are combined with each other, and the price of the combined content is discounted based on how many ad contents are added to the multi-media content. Accordingly, this method can induce increased sales of multi-media contents by discounting goods sold in connection with ads. Additionally, this method helps guarantee the effectiveness of ads by reproducing the ads together with the multi-media content whenever the multi-media content is played back.

36 Claims, 5 Drawing Sheets

U.S. PATENT DOCUMENTS

| | | | |
|---|---|---|---|
| 2001/0021915 A1* | 9/2001 | Cohen et al. | 705/14 |
| 2001/0034651 A1* | 10/2001 | Marks et al. | 705/14 |
| 2001/0041053 A1* | 11/2001 | Abecassis | 386/83 |
| 2001/0052001 A1* | 12/2001 | Stern | 709/219 |
| 2002/0007313 A1* | 1/2002 | Mai et al. | 705/14 |
| 2002/0046087 A1* | 4/2002 | Hey | 705/14 |
| 2002/0054087 A1* | 5/2002 | Noll et al. | 345/744 |
| 2002/0082910 A1* | 6/2002 | Kontogouris | 705/14 |
| 2002/0099564 A1* | 7/2002 | Kim et al. | 705/1 |
| 2003/0206720 A1* | 11/2003 | Abecassis | 386/83 |
| 2005/0132295 A1* | 6/2005 | Noll et al. | 715/744 |

FOREIGN PATENT DOCUMENTS

| | | |
|---|---|---|
| KR | 2001-0073436 | 8/2001 |
| WO | WO 200273967 A2 * | 9/2002 |
| WO | WO 200188738 A * | 10/2002 |

OTHER PUBLICATIONS

"Rich Media Advertising Just Got Richer: Announcing the launch of Zebus", Jan. 9, 2001, Business Wire. New York: p. 1.*

"Wired and Kodak Team-up for 12-Month Cross-Media Advertising Push", Jan. 19, 1998, PR Newswire. New York: p. 1.*

"Rich Media Advertising Just Got Richer: Announcing the launch of Zebus", Jan. 9, 2001, Business Wire, New York: p. 1.*

* cited by examiner

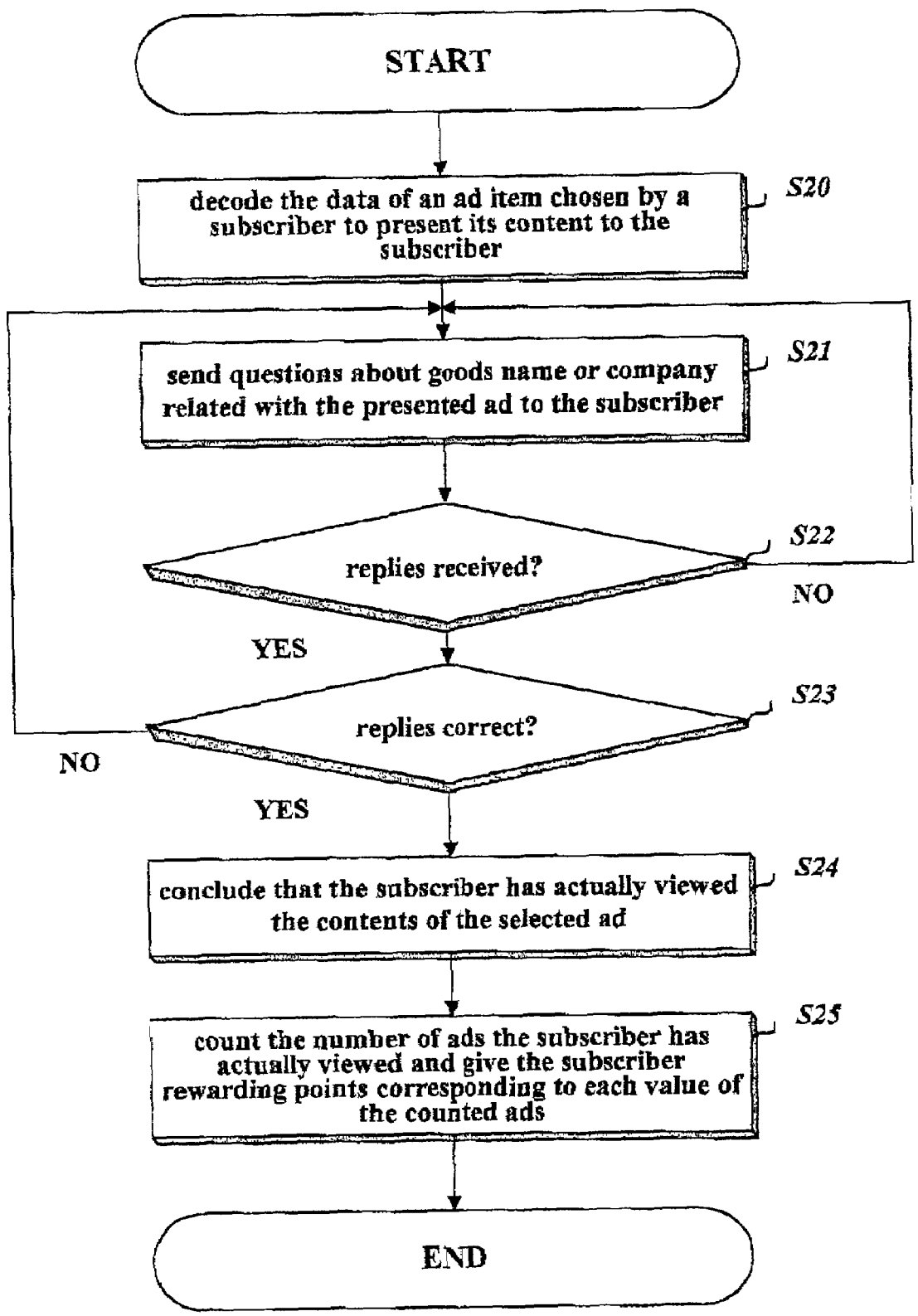

METHOD OF ADVERTISING AND CONDUCTING ELECTRONIC COMMERCIAL TRANSACTIONS THROUGH A COMMUNICATION NETWORK

BACKGROUND OF THE INVENTION

1. Field of the Invention

The present invention relates to a method of advertising and conducting electronic commercial transactions and, more particularly, to a method of discounting a multimedia item.

2. Background of the Related Art

FIG. 1 is an illustrative whole-network system capable of providing a general electronic commercial transaction service. The network system of FIG. 1 comprises a content sale server (CSS) 30 providing for sale various video and audio contents through a communication network; a plurality of personal communication terminals (PCTs) $10_1$ to $10_n$, such as personal computers (PCs); a plurality of on-line sale servers $20_1$ to $20_m$; and Internet 100 providing data communication paths among the network elements. An electronic commercial transaction conducted in the network system of FIG. 1 is described below.

A buyer who wants to buy a digital audio or video content item through an on-line content selling service, provided by CSS 30, becomes a member of CSS 30 using his or her PCT $10_1$. After subscribing, he or she is authenticated through his or her username and password, allocated during the previous subscription step, and then selects one or more multi-media content items to buy. The selected items are downloaded from CSS 30 to PCT $10_1$, through Internet 100, or delivered to the buyer through a transportation means. The charge for the selected items is paid through conventional ways, such as a credit card system or a cable transfer between bank accounts.

CSS 30 can show a buyer various advertising materials furnished by many goods sellers, while it is selling various multi-media content items through Internet 100. The advertising materials can be presented on PCT $10_n$ in various forms, like a banner, etc. Through this presentation, various goods are advertised to consumers.

Thus, a company or a businessman operating CSS 30 can make profits through advertisements, provided by the advertisers operating sale servers $20_1$ to $20_m$, as well as through the sale of on-line goods over the Internet.

The number of servers conducting advertisements and electronic commercial transactions has increased remarkably, these days. Thus, more effective and distinctive methods for selling goods and content are required. Moreover, it is difficult to verify the effectiveness of advertising with a display banner on a buyer's terminal. As a result, advertisers do not regard the aforementioned advertising method as effective any more.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a method of advertising and conducting electronic commercial transactions that is capable of discounting audio and video or other media contents to be sold on-line, in connection with advertisements (ads).

It is a further object of the invention to guarantee the effectiveness of ads used in connection with the on-line sale.

In order to achieve at least the above objects, in whole or in part, there is provided a method of advertising and conducting electronic commercial transactions through a communication network, including selecting a first content to buy through the communication network, selecting at least one second content having an effect of information conveyance, combining the first content and the second content into a third content, and determining the price of the third content based on the first and the second content.

In order to achieve at least the above objects, in whole or in part, there is provided another method of advertising and conducting electronic commercial transactions through a communication network, including selecting an ad item, presenting the selected ad item, asking a question about the content of the presented ad item, receiving a reply to the question, and determining whether a user has viewed the presented ad item based on the information contained in the reply.

In order to achieve at least the above objects, in whole or in part, there is provided another method of advertising and conducting electronic commercial transactions through a communication network, including selecting a multi-media content to buy through the communication network, selecting at least one ad content, presenting the selected ad content and asking a question about the presented ad content, receiving a reply to the question and determining whether a user has viewed the presented ad content based on the information contained in the reply, combining the multi-media content and the ad content, and determining the price of the combined content based on the price of the multi-media content and the number of ads.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 illustrates a flow chart of a method of advertising and conducting electronic commercial transactions through a communication network, according to another embodiment of the present invention.

DETAILED DESCRIPTION OF PREFERRED EMBODIMENTS

Figure 1:
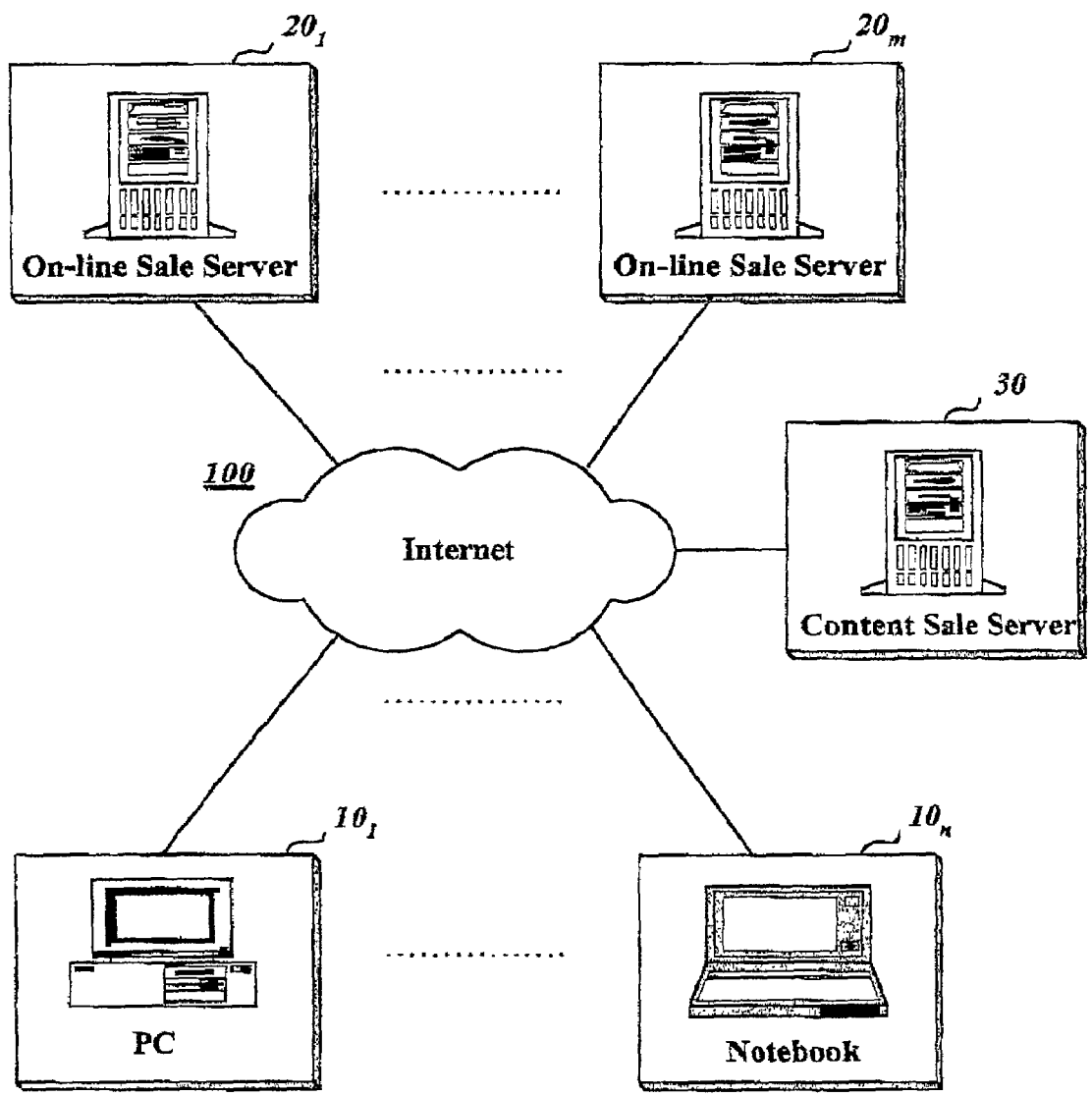
FIG. 1 illustrates a whole network system capable of providing a general electronic commercial transaction service.
Figure 2:
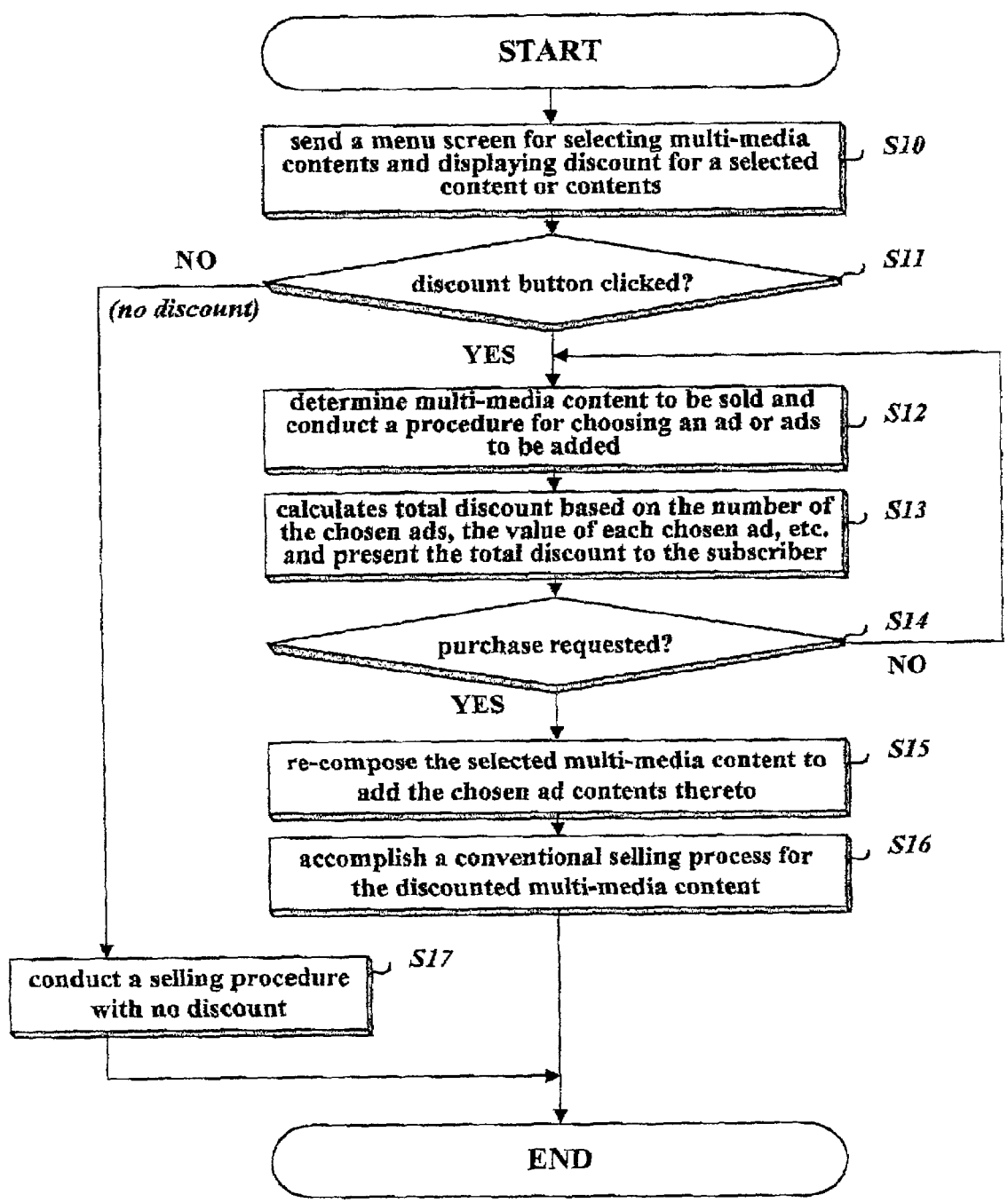
FIG. 2 illustrates a flow chart of a method of advertising and conducting electronic commercial transactions through a communication network, according to a preferred embodiment of the present invention.

FIG. 2 is a flow chart of a method of advertising and conducting electronic commercial transactions according to a preferred embodiment of the present invention. The method of FIG. 2 is preferably conducted in the network system of FIG. 1, where CSS 30 has the necessary functions for conducting the method according to the present invention. The method is described below in greater detail, with reference to FIG. 2. Although the method described below relates to the purchase of a digital audio or video content item, it should be understood that the methods described herein can be applied to any on-line purchase transaction.

Figure 3:
FIGS. 3 and 4 illustrate examples of a menu screen presented on a personal communication terminal, in accordance with the preferred embodiment of the present invention.

A buyer who wants to buy digital audio or video content items through an on-line content sale service, provided by CSS 30, becomes a member of CSS 30 using his or her PCT $10_1$. After subscription, he or she is authenticated through his or her username and password, which was allocated during the previous subscription step. If the authentication is successful, the subscriber can buy various multi-media contents on-line from CSS 30. To accomplish an on-line transaction, CSS 30 sends a menu screen 300, illustrated by the example of FIG. 3. Menu screen 300 is used for selecting multi-media contents 301 to buy and for displaying a possible discount of a selected content or contents 301 to PCT $10_1$ of the subscriber (S10). Then, the sent menu screen 300 is displayed on a displaying unit of PCT $10_1$, in which a viewing program (e.g., a web browser capable of interpreting data received from CSS 30) is embedded.

The menu screen 300 sent to PCT $10_1$ also contains discount buttons 302 for each content item 301 to be sold. Accordingly, if the subscriber wants to buy a multi-media content item 301 or items more cheaply, he or she clicks the discount button 302 below a desired content item 301.

If the subscriber clicks the discount button 302 to buy a corresponding multimedia content item 301 at a discount (S11), CSS 30 recognizes that the multi-media content item 301 above the clicked button 302 is selected for purchase by the subscriber and, then, conducts a procedure for choosing an ad or ads to be added to the selected content item (S12). In the ad choosing procedure, one or more ads pre-assigned to the content item are chosen by CSS 30, or are freely chosen by the subscriber from an ad list, provided by CSS 30. In addition, each ad item may include a list of other goods and address information (e.g., URL (Uniform Resource Locator) information of other on-line sale servers).

After selecting ads to be added, CSS 30 calculates how much the selected multi-media content item 301 must be discounted based on the number of chosen ads, the repeated selection of the same ad, and the value of each chosen ad. Thereafter, CSS 30 shows the calculated discount to the subscriber (S13).

Figure 4:
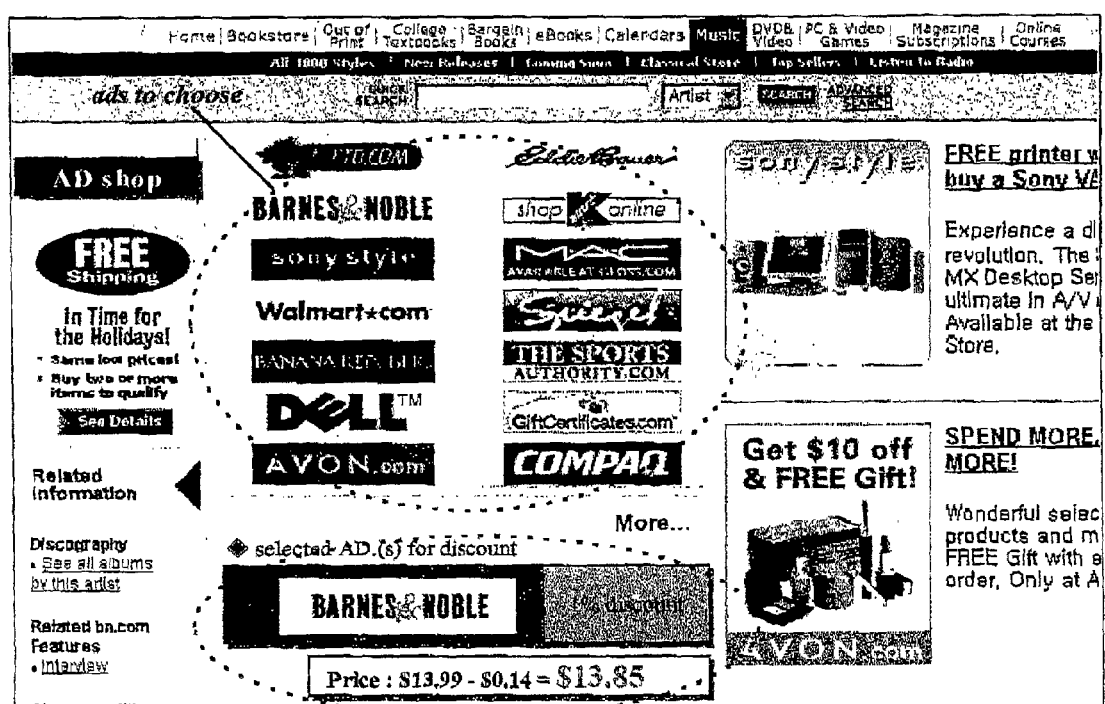

FIG. 4 illustrates how a selected content item 301 is discounted. Suppose the price of a selected content item 301 is $13.99 and the value of an ad 401 chosen by the subscriber, or pre-assigned to the selected content item 301, is $0.14. Thus, the calculated sale price of the selected content item 301 becomes $13.85 (i.e., $13.99-$0.14) and it is shown to the subscriber. If the subscriber is not satisfied with the discount and willingly suffers future inconvenience by viewing at least one additional ad, he or she holds up the purchase request (S14) and selects more ads 402 to be added to the selected multi-media content item 301. Then, CSS 30 recalculates the discount in accordance with the additional ad or ads and shows it to the subscriber, in the aforementioned manner.

However, each value of the additional ad or ads 402 is not wholly given to the subscriber at this time. Instead, each value is reduced in proportion to the number of additional ads. For example, if an ad having a value of $0.14 is chosen second, the value $0.14 is reduced by 10% because it is chosen second. Therefore, the discount attributed to the second ad becomes $0.126. Similarly, the reduction rate for the third ad is increased to 20%. In other words, the more ads the subscriber selects to add, the more the reduction rate is increased. For instance, if three ads worth $0.14 each are chosen, the total discount becomes $0.378 (i.e., $0.14+ $0.126+$0.112).

In addition, if the same ad is chosen repeatedly, the increment of the reduction rate may be enlarged to 20% or more, to reduce the discount advantage given to one subscriber, who repeatedly selects the same ad. This greater reduction is intended to protect the advertiser, since the ad's effectiveness is increased only slightly, when selected repeatedly by the same subscriber.

If the subscriber thinks the number of selected ads and the discount are reasonable, he or she clicks a purchase button on the displayed menu screen. Then, CSS 30 recomposes the selected multi-media content 301 to add the chosen ad contents 401, 402 thereto (S15). The re-composed multi-media content with the chosen ad contents 401, 402 is then sold to the subscriber with the discount, calculated as above. The next step of the selling process, including settlement request and acknowledgment, is accomplished through conventional methods via a network (S16). Thereafter, the purchased content is downloaded or delivered to the subscriber's residence. The contents may be saved in a recording medium, such as a CD, a DVD, an FDD, an HDD, or a memory.

Figure 5:
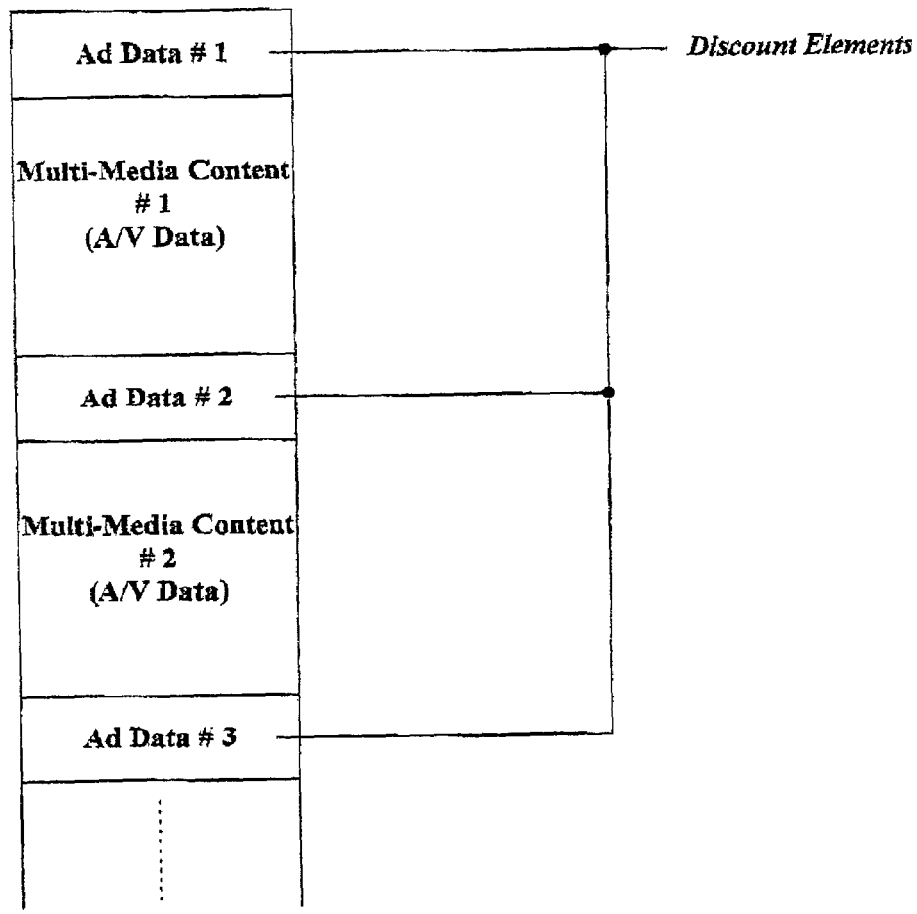
FIG. 5 illustrates a format of combined contents from multi-media data and ad data.
Figure 6:
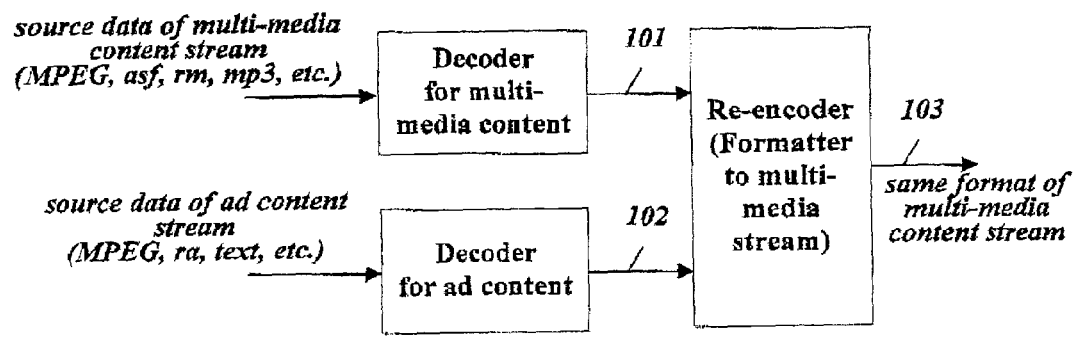
FIG. 6 illustrates combining the multi-media content and ad content.

The multi-media content 301 to be sold may be re-composed in such a manner that an ad content 401, 402 is added anywhere, such as in front, the middle, or behind the multi-media content, as shown in FIG. 5. When re-composing the multi-media content 301 with the ad content or contents 401, 402, the multi-media content and ad content are individually decoded first (101 and 102), as shown in FIG. 6. Then, the individual decoded data of the multi-media and ad content are combined, while being encoded again (103) in the format of the multi-media 301 content to be sold. Finally, the re-encoded multi-media content 301, including the chosen ad content or contents 401, 402, are downloaded or delivered to the subscriber.

Instead of mixing ad contents 401, 402 with a multi-media content 301 to be sold, the ad contents 401, 402 may be inserted in a predetermined field, specified in the format of the multi-media content 301, without any format conversion. For example, if the multi-media content 301 to be sold is 'mp3' audio data and the ad content 401, 402 is composed of text data, the text of the ad content 401, 402 is simply inserted behind the 'TAG' field. The text data of the ad content 401, 402 inserted behind the 'TAG' field will be displayed in a liquid crystal display (LCD) window, equipped in an 'mp3' player.

The discount advantage acquired from the addition of the ad contents 401, 402 to the multi-media content 301 may be reserved for cash back or later use as a purchase discount for another multi-media content item 301.

To enhance the effect of advertisement and discount, CSS 30 can withhold the price reduction until after it verifies that the subscriber has actually viewed or considered the contents of selected ads 401, 402 at least once, as shown in FIG. 7. The method depicted in FIG. 7 may be conducted separately from, or together with, the above-mentioned method of FIG. 2. The method of FIG. 7 is explained below in greater detail.

CSS 30 decodes data of an ad item, chosen by a subscriber, so that it may present the decoded contents to the subscriber before discounting the price of the corresponding multi-media content item 301 (S20). Then, CSS 30 sends an electronic questionnaire to the subscriber's PCT $10_1$ (S21). This electronic questionnaire may contain questions about the good's name or the ad company related to the selected ad item 401, 402. The contents of the electronic questionnaire are displayed on PCT $10_1$, using an appropriate embedded protocol interpreter.

After the electronic questionnaire is sent, replies are made by the subscriber (S22). Then, CSS 30 examines whether the replies are correct or not. If correct (S23), CSS 30 concludes that the subscriber has actually viewed or considered the content of the selected ad item (S24). If CSS 30 receives an incorrect reply or no reply, then step S21 is repeated.

While verifying the reply for each selected ad item, as above, CSS 30 counts the number of ad items the subscriber has actually viewed and gives the subscriber rewarding points corresponding to each value of the counted ad items (S25). The rewarding points can be used for price reduction, mileage, electronic coupon, goods purchase, etc.

Therefore, the rewarding points are accumulated for each subscriber, identified by his or her username entered at the previous login step. The rewarding points can also be used for the above-explained multi-media content purchasing procedure. Namely, if a subscriber assigns some points from his or her total accumulated rewarding points, the price of selected multi-media content items 301 is discounted by an amount of money corresponding to the assigned points.

The method of advertising and conducting electronic commercial transactions through a communication network, in accordance with the present invention, can induce increased sales of multi-media contents using discounts in connection with ads. Additionally, the invention helps guarantee the effectiveness of ads by reproducing an ad or ads together with a multi-media content, whenever the multimedia content is played back. As a result, more advertisers can be won over so that profits through ad sales can be increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of conducting electronic commercial transactions through a communication network, comprising:
(a) providing access to a website displaying information representing a plurality of contents and an option to purchase each of said contents with or without a discount;
(b) receiving a first signal selecting the displayed option to buy a first content with a discount from the website accessed through the communication network;
(c) receiving a second signal selecting at least one second content having an effect of information conveyance, the second content including advertisement information displayed in response to the first signal;
(d) combining the first content and the second content into a third content;
(e) reducing a price of the first content from a first price to a second price based on the discount computed from selection of the second content; and
(f) providing the third content to a buyer in response to payment of the second price, wherein reducing the price includes:
reducing the first price to the second price by a predetermined value of the selected advertisement;
receiving a third signal selecting another advertisement; and
reducing the second price to a third price by an amount equal to less than a predetermined value of the other selected advertisement.

2. The method of claim 1, wherein step (d) adds the second content to at least one of a front, middle, and rear of the first content.

3. The method of claim 2, wherein each second content is converted to the format of the first content, before the combination.

4. The method of claim 1, wherein the discount is determined based on a number of second contents combined with the first content or each value of the second contents.

5. The method of claim 4, wherein the first price of the first content is reduced to the second price in proportion to the number of second contents combined to the first content based on the discount.

6. The method of claim 1, wherein each second content includes a list of other contents to be sold or address information of other servers providing on-line sale services.

7. The method of claim 1, wherein step (f) includes:
storing the third content in a recording medium to be delivered to the buyer.

8. The method of claim 7, wherein the recording medium is one of a CD, a DVD, an FDD, an HDD, and a memory.

9. The method of claim 1, wherein step (f) includes:
transmitting the third content to the buyer on-line through the communication network.

10. The method of claim 9, wherein the third content is formatted as MPEG data.

11. The method of claim 1, wherein the second content is inserted in a prescribed field, defined in the first content, without any data conversion.

12. The method of claim 1, wherein the second content selected in step (c) is selected by a buyer or a seller of the first content.

13. The method of claim 1, wherein the first and second contents are combined such that the play back of the first content cannot be obtained without the playback of the second content.

14. The method of claim 1, wherein a subscription for accessing the website is priced independently from the price of the first content.

15. The method of claim 14, wherein the subscription to the website is obtained by obtaining a username and password.

16. The method of claim 1, further comprising:
displaying a separate price for each of the displayed plurality of contents represented on the website.

17. The method of claim 1, wherein access to the website is provided before the second signal is received.

18. The method of claim 1, wherein the second price is reduced by a first amount less than the predetermined value of the other advertisement when the other advertisement is newly selected by the buyer, and wherein the second price is reduced by a second amount less than the predetermined value of the other advertisement when the other advertisement has been previously selected by the buyer.

19. The method of claim 1, wherein said amount corresponds to a predetermined percentage of the value of the other selected advertisement.

20. The method of claim 1, further comprising:
receiving additional signals selecting additional advertisements;
reducing the third price by respective amounts equal to less than predetermined values of the additional selected advertisements, wherein reduction rates corresponding to the additional selected advertisements increase in predetermined increments based on order of selection.

21. A method of purchasing multimedia content over a communications network, comprising:
providing access to a website displaying information representing a plurality of multimedia content items and an option to purchase each of said contents with or without a discount;
receiving a signal selecting at least one multimedia content item for purchase at a first prescribed price, from among the plurality of multimedia content items;
selecting at least one advertisement item having a prescribed value, from among a plurality of advertisement items;
combining a content of the at least one selected advertisement item with a content of the at least one multimedia content item; and
determining a final purchase price by reducing the first prescribed price for the at least one multimedia content item by the prescribed value of the at least one advertisement item, wherein the at least one selected advertisement item is pre-assigned for display when the at least one multimedia content is selected, wherein the website displays:
a first selectable icon corresponding to an undiscounted price of the at least one multimedia content item; and
a second selectable icon representing an option to purchase the at least one multimedia content item with a discount which corresponds to the prescribed value of the at least one advertisement item.

22. The method of claim 21, wherein the at least one selected advertisement item and the at least one multimedia content item are integrally combined into a compilation, and the at least one multimedia content item cannot be played back from the compilation without the playback of the at least one selected advertisement item.

23. A method of conducting electronic commercial transactions through a communication network, comprising:
(a) providing access to a website displaying information representing a plurality of contents and an option to purchase each of said contents with or without a discount;
(b) receiving a first signal selecting the displayed option to buy a first content with a discount from the website accessed through the communication network;
(c) receiving a second signal selecting at least one second content having an effect of information conveyance, the second content including advertisement information displayed in response to the first signal;
(d) combining the first content and the second content into a third content;
(e) reducing a price of the first content from a first price to a second price based on the discount computed from selection of the second content; and
(f) providing the third content to a buyer in response to payment of the second price, wherein the advertisement is pre-assigned for display when the first content is selected.

24. The method of claim 23, further comprising:
withholding reducing the price until receiving confirmation that the user actually viewed the selected advertisement.

25. The method of claim 23, wherein (f) includes withholding determining the second price by reducing the first price until receiving confirmation that the user actually viewed the selected second content.

26. The method of claim 25, wherein each second content comprises advertising materials.

27. The method of claim 23, wherein the first and second contents are integrally combined into the third content and the first content cannot be played back from the third content without the playback of the second content.

28. The method of claim 23, wherein a subscription for accessing the website is priced independently from the price of the first content.

29. The method of claim 28, wherein subscription to the website is obtained by obtaining a username and password.

30. A method of conducting electronic commercial transactions through a communication network, comprising:
(a) providing access to a website displaying information representing a plurality of contents and an option to purchase each of said contents with or without a discount;
(b) receiving a first signal selecting the displayed option to buy a first content with a discount from the website accessed through the communication network;
(c) receiving a second signal selecting at least one second content having an effect of information conveyance, the second content including advertisement information displayed in response to the first signal;
(d) combining the first content and the second content into a third content;
(e) reducing a price of the first content from a first price to a second price based on the discount computed from selection of the second content; and
(f) providing the third content to a buyer in response to payment of the second price, wherein (a) includes:
displaying a first selectable icon corresponding to an undiscounted price of the first content; and
displaying a second selectable icon representing said option to purchase the first content with a discount.

31. The method of claim 30, wherein the first and second selectable icons are simultaneously displayed on the website adjacent an object representing the first content.

32. The method of claim 31, wherein the object is a graphical object corresponding to or an image of the first content.

33. The method of claim 32, further comprising:
displaying a first list of advertisers or advertisements on a different web page in response to selection of the displayed option by the first signal;
displaying a second list of advertisers or advertisements selected by the buyer from the first list, the second list including the advertisement information selected by the second signal.

34. The method of claim 33, further comprising:
displaying the second price as reduced by the discount adjacent the second list.

35. The method of claim 34, wherein the second price is displayed as a formula which includes an original price of the first content minus the discount to equal the second price.

36. A method of purchasing multimedia content over a communications network, comprising:
providing access to a website displaying information representing a plurality of multimedia content items and an option to purchase each of said contents with or without a discount;
receiving a signal selecting at least one multimedia content item for purchase at a first prescribed price, from among the plurality of multimedia content items;
selecting at least one advertisement item having a prescribed value, from among a plurality of advertisement items;
combining a content of the at least one selected advertisement item with a content of the at least one multimedia content item; and
determining a final purchase price by reducing the first prescribed price for the at least one multimedia content item by the prescribed value of the at least one advertisement item, wherein determining the final purchase price includes:
reducing the first prescribed price to a second price by the prescribed value of the at least one advertisement item;
receiving a signal selecting another advertisement item; and
reducing the second price to a third price by an amount equal to less than a prescribed value of the other selected advertisement item.

* * * * *